US008144419B1

United States Patent
Liu

(10) Patent No.: US 8,144,419 B1
(45) Date of Patent: Mar. 27, 2012

(54) DISK DRIVE DETECTING HEAD TOUCHDOWN FROM MICROACTUATOR SIGNAL

(75) Inventor: Yanning Liu, San Ramon, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 12/766,668

(22) Filed: Apr. 23, 2010

(51) Int. Cl.
*G11B 21/02* (2006.01)
*G11B 27/36* (2006.01)

(52) U.S. Cl. .......................................... 360/75; 360/31

(58) Field of Classification Search .................. None
See application file for complete search history.

(56) References Cited

U.S. PATENT DOCUMENTS

| | | | |
|---|---|---|---|
| 6,008,640 A | 12/1999 | Tan et al. | |
| 6,196,062 B1 | 3/2001 | Wright et al. | |
| 6,293,135 B1 | 9/2001 | Marchon et al. | |
| 6,757,124 B2 | 6/2004 | Kelemen | |
| 6,822,821 B2 | 11/2004 | Gan et al. | |
| 7,121,133 B2 | 10/2006 | Chu et al. | |
| 7,190,547 B2 | 3/2007 | Khurshudov et al. | |
| 7,502,194 B2 | 3/2009 | Alexander et al. | |
| 7,630,162 B2 | 12/2009 | Zhao et al. | |
| 7,796,356 B1 * | 9/2010 | Fowler et al. | 360/75 |
| 7,800,858 B1 * | 9/2010 | Bajikar et al. | 360/75 |
| 2008/0259480 A1 | 10/2008 | Pham et al. | |

* cited by examiner

*Primary Examiner* — K. Wong

(57) ABSTRACT

A disk drive is disclosed comprising a head actuated over a disk surface by a microactuator, and a fly height actuator operable to adjust a fly height of the head. A servo control voltage is applied to the microactuator, and the fly height actuator is adjusted to decrease a fly height of the head. The servo control voltage is filtered to generate a filtered voltage. A touchdown signal is generated in response to the microactuator and the filtered voltage, wherein the touchdown signal indicates when the head contacts the disk.

22 Claims, 4 Drawing Sheets

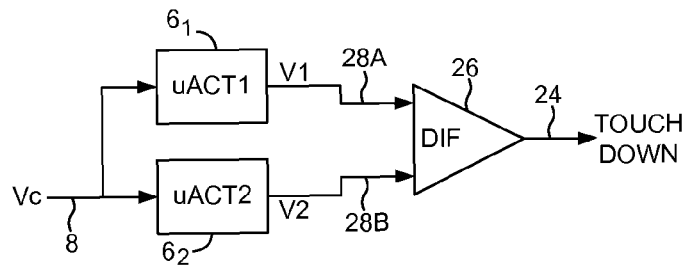
FIG. 2A
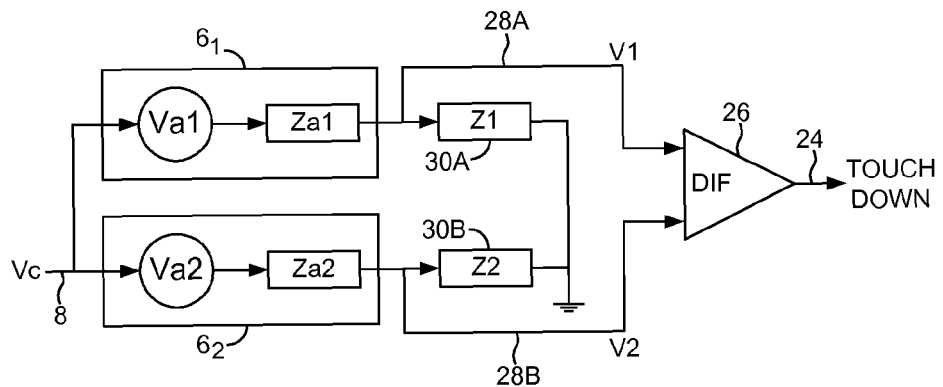
FIG. 2B
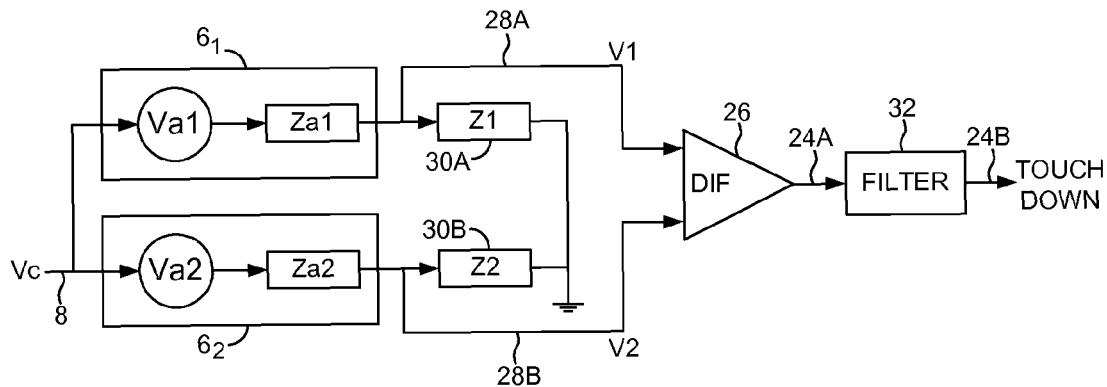
FIG. 2C
$$V1 - V2 = \frac{Z1 \cdot Za2 - Z2 \cdot Za1}{(Za2 + Z2)(Za1 + Z1)} Vc + \frac{Z1}{Za1 + Z1} Va1 + \frac{Z2}{Za2 + Z2} Va2$$
FIG. 2D

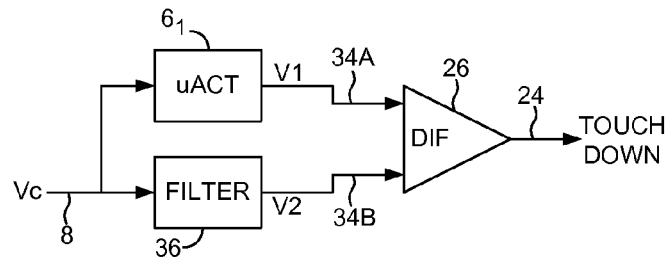
FIG. 3A
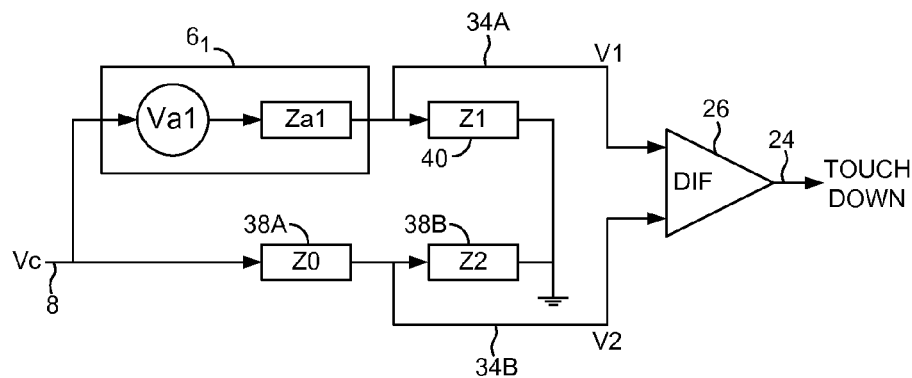
FIG. 3B
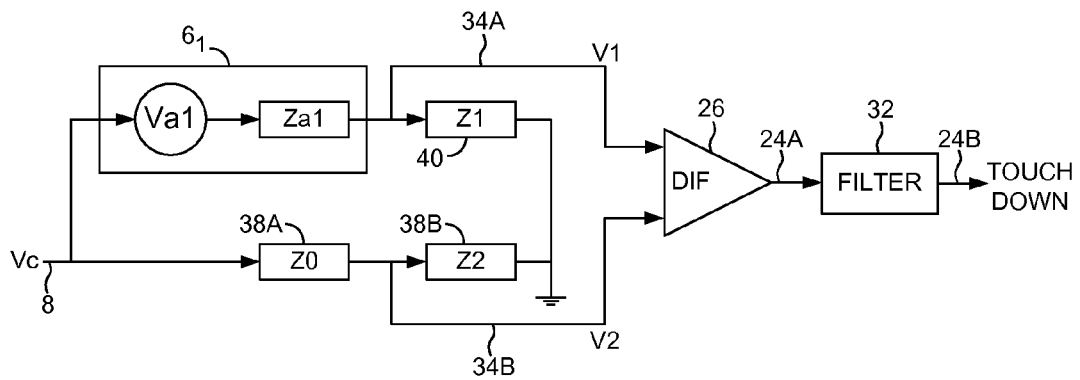
FIG. 3C
$$V1 - V2 = \frac{Z1 \cdot Z0 - Z2 \cdot Za1}{(Z0 + Z2)(Za1 + Z1)} Vc + \frac{Z1}{Za1 + Z1} Va1$$
FIG. 3D

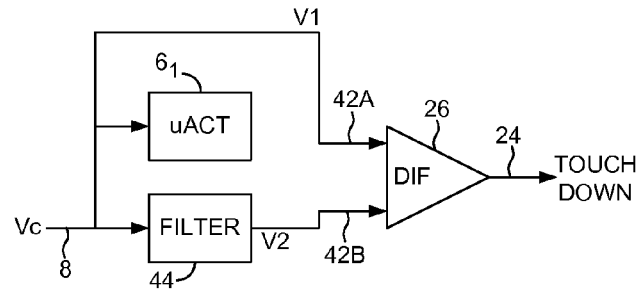
FIG. 4A
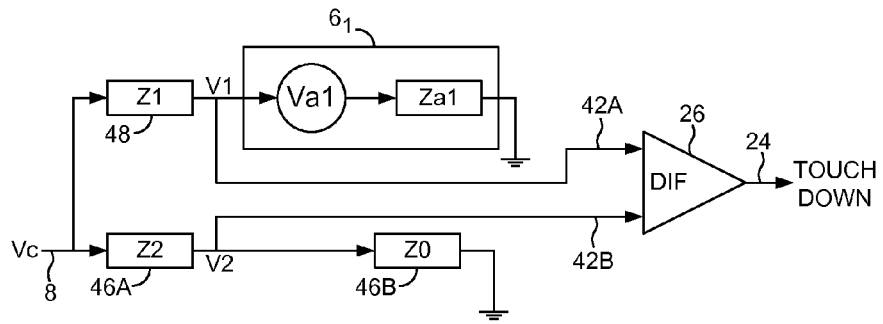
FIG. 4B
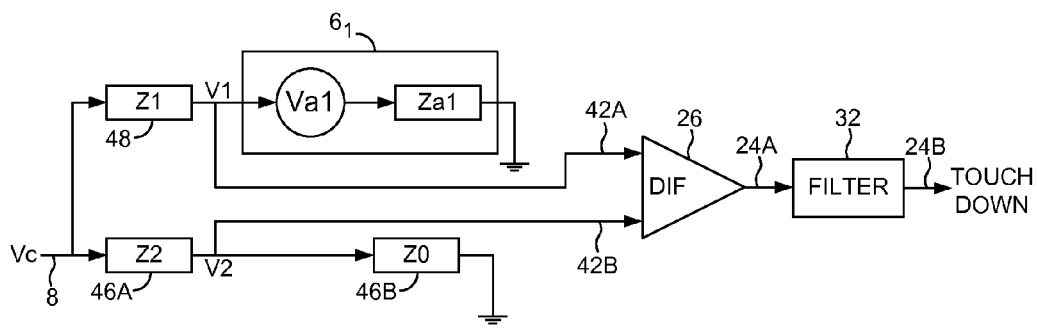
FIG. 4C
$$V1 - V2 = \frac{Za1 \cdot Z2 - Z0 \cdot Z1}{(Za1 + Z1)(Z0 + Z2)} Vc + Va1$$
FIG. 4D

US 8,144,419 B1

DISK DRIVE DETECTING HEAD TOUCHDOWN FROM MICROACTUATOR SIGNAL

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

An air bearing forms between the head and the disk due to the disk rotating at high speeds. Since the quality of the write/read signal depends on the fly height of the head, conventional heads (e.g., a magnetoresistive heads) may comprise an actuator for controlling the fly height. Any suitable fly height actuator may be employed, such as a heater which controls fly height through thermal expansion, or a piezoelectric (PZT) actuator. It is desirable to determine the appropriate fly height actuator control signal (e.g., appropriate current applied to a heater) that achieves the target fly height for the head.

BRIEF DESCRIPTION OF THE DRAWINGS

FIG. 2A shows an embodiment of the present invention wherein a head touchdown signal is generated by applying a servo control voltage to two microactuators and evaluating a difference between an output of the microactuators.

FIG. 2B shows an embodiment of the present invention wherein a first impedance couples the output of the first microactuator to ground and a second impedance couples the output of the second microactuator to ground.

FIG. 2C shows an embodiment of the present invention wherein a filter filters the touchdown signal to substantially cancel an effect of the servo control voltage on the touchdown signal.

FIG. 2D shows an equation illustrating how the touchdown signal is generated according to an embodiment of the present invention.

FIG. 3A shows an embodiment of the present invention wherein a head touchdown signal is generated by applying a servo control voltage to a microactuator and evaluating a difference between an output of the microactuator and the servo control voltage after being filtered.

FIG. 3B shows an embodiment of the present invention wherein the servo control voltage is filtered using first and second impedances connected in series, and the output of the microactuator is coupled to ground by a third impedance.

FIG. 3C shows an embodiment of the present invention wherein a filter filters the touchdown signal to substantially cancel an effect of the servo control voltage on the touchdown signal.

FIG. 3D shows an equation illustrating how the touchdown signal is generated according to an embodiment of the present invention.

FIG. 4A shows an embodiment of the present invention wherein a head touchdown signal is generated by applying a servo control voltage to a microactuator and evaluating a difference between an input of the microactuator and the servo control voltage after being filtered.

FIG. 4B shows an embodiment of the present invention wherein the servo control voltage is filtered using first and second impedances connected in series, and third impedance couples the servo control voltage to an input of the microactuator.

FIG. 4C shows an embodiment of the present invention wherein a filter filters the touchdown signal to substantially cancel an effect of the servo control voltage on the touchdown signal.

FIG. 4D shows an equation illustrating how the touchdown signal is generated according to an embodiment of the present invention.

DETAILED DESCRIPTION OF EMBODIMENTS OF THE INVENTION

Figure 1A:
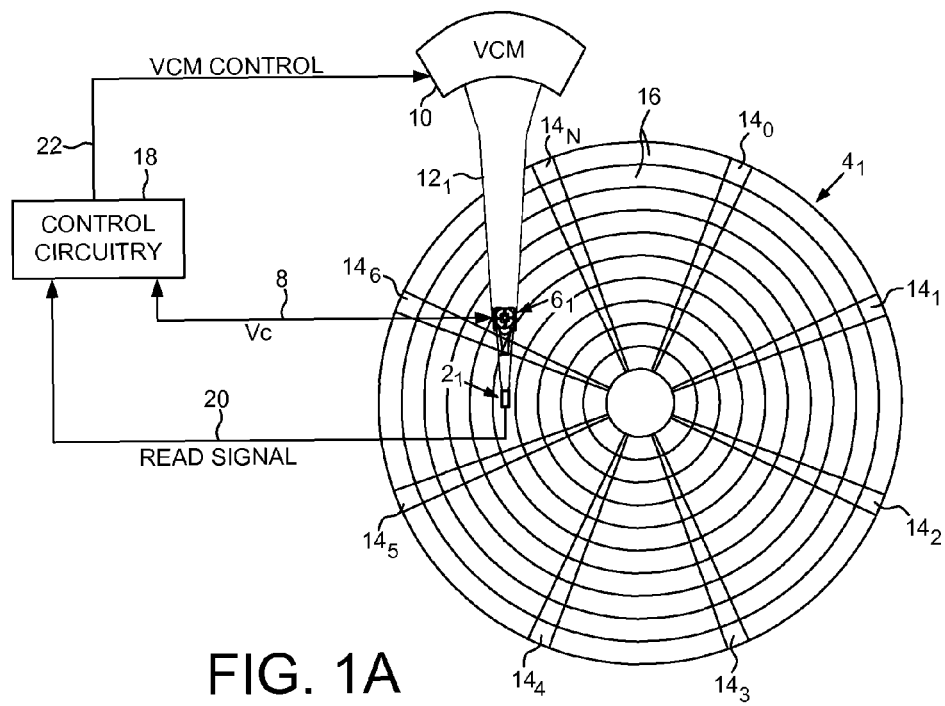
FIGS. 1A and 1B show a disk drive according to an embodiment of the present invention comprising heads actuated over disk surfaces by a voice coil motor and microactuators, wherein a fly height of each head is controlled using a fly height actuator.

FIG. 1A shows a disk drive according to an embodiment of the present invention comprising a head $2_1$ actuated over a disk surface $4_1$ by a microactuator $6_1$, and a fly height actuator operable to adjust a fly height of the head $2_1$. A servo control voltage Vc 8 is applied to the microactuator $6_1$, and the fly height actuator is adjusted to decrease a fly height of the head $2_1$. The servo control voltage Vc 8 is filtered to generate a filtered voltage. A touchdown signal is generated in response to the microactuator $6_1$ and the filtered voltage, wherein the touchdown signal indicates when the head $2_1$ contacts the disk surface $4_1$.

Figure 1B:
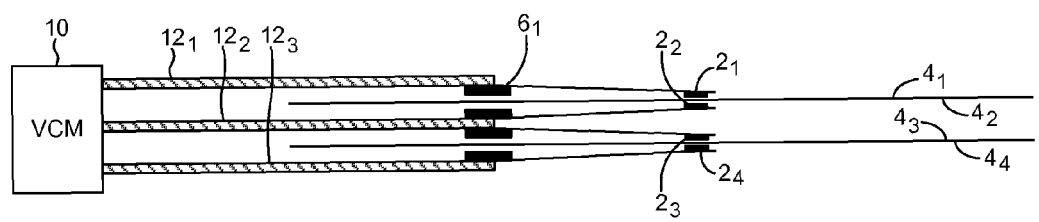

In an embodiment shown in FIG. 1B, a plurality of heads $2_1$-$2_4$ are actuated over respective disk surfaces $4_1$-$4_4$ by a voice coil motor (VCM) 10 which rotates actuator arms $12_1$-$12_3$ about a pivot. A plurality of embedded servo sectors $14_0$-$14_N$ are recorded on each disk surface (e.g., disk surface $4_1$) to define a plurality of data tracks 16, wherein each servo sector comprises suitable position information, such as a track address providing coarse position information and servo bursts providing fine position information. As the head passes over a servo sector, control circuitry 18 demodulates a read signal 20 emanating from the head into a position error signal (PES). The PES is filtered by a suitable compensation filter to generate a control signal 22 applied to the VCM 10. The VCM 10 rotates the actuator arm about the pivot in order to position the head radially over the disk surface in a direction that reduces the PES. In order to increase the bandwidth of the servo system to thereby increase the data tracks per inch (TPI), the control circuitry 18 also generates a servo control voltage Vc 8 applied to the microactuator coupled to the actuator arm in order to provide fine position control of the head while tracking the centerline of a target data track.

Any suitable fly height actuator may be employed in the embodiments of the present invention, such as a suitable heating element or a piezoelectric element integrated with the head. In one embodiment, the control circuitry 18 calibrates an operating fly height for each head by determining the fly height control signal that causes the head to contact the disk surface (touchdown). The operating fly height control signal may then be selected, for example, by backing off the touchdown control signal by a predetermined or computed offset. In one embodiment, the microactuator for actuating the head over the disk surface is used to detect when the head contacts the disk surface during the touchdown calibration. In order to maintain the head over a target track during the touchdown calibration, the microactuator is used to servo the head in response to the servo control voltage Vc while simultaneously using the microactuator to detect the touchdown.

When generating the touchdown signal using the microactuator, the servo control voltage Vc may be filtered in any suitable manner to generate the filtered voltage. FIG. 2A shows an embodiment of the present invention wherein a secondary microactuator of a multi-disk surface disk drive is used to filter the servo control voltage Vc 8. In this embodiment, the control circuitry 18 generates the touchdown signal 24 in response to a difference 26 between a first voltage 28A output by the first microactuator $6_1$ and a second voltage 28B output by a second microactuator $6_2$.

FIG. 2B shows an embodiment of the present invention wherein a first impedance Z1 30A couples the output of the first microactuator $6_1$ to ground, and a second impedance Z2 30B couples the output of the second microactuator $6_2$ to ground. FIG. 2D shows an equation illustrating how the control circuitry of FIG. 2B generates the touchdown signal 24 as the difference 26 between the first voltage 28A and the second voltage 28B. Each microactuator comprises an induced voltage Vai due to the microactuator moving (e.g., due to the head contacting the disk surface), as well as an internal impedance Zai. In one embodiment, the touchdown is calibrated one head at a time, so that only one of the microactuators of FIG. 2A will have a non-zero induced voltage Vai in the equation of FIG. 2D. The first and second impedance Z1 and Z2 are selected such that the term $(Z1 \cdot Za2 - Z2 \cdot Za1)$ in the equation of FIG. 2D is approximately zero thereby substantially canceling the effect of the servo control voltage Vc on the touchdown signal. Canceling the servo control voltage Vc from the touchdown signal enables the servo control voltage Vc to servo the microactuator during the touchdown calibration while simultaneously detecting touchdown from the induced voltage Vai of the microactuator.

The effect of the servo control voltage Vc may not be completely canceled from the touchdown signal since the first and second impedance Z1 and Z2 cannot be selected perfectly for every disk drive. Therefore, in one embodiment shown in FIG. 2C, the control circuitry may further comprise a filter 32 for filtering the touchdown signal 24A to substantially cancel any remaining effect of the servo control voltage Vc on the touchdown signal 24A (thereby generating a filtered touchdown signal 24B). The filter 32 may comprise any suitable frequency response, wherein in one embodiment the servo control voltage Vc comprises mainly low frequencies and the induced voltage Vai due to touchdown comprises higher frequencies. Therefore, in one embodiment the filter 32 comprises a suitable high pass filter or bandpass filter matched to a frequency band where the induced voltage Vai due to touchdown is expected to occur.

FIG. 3A shows an embodiment of the present invention wherein the control circuitry generates the touchdown signal 24 in response to a difference 26 between a voltage 34A output by a microactuator $6_1$ and a filtered servo control voltage 34B. The filter 36 for filtering the servo control voltage Vc 8 may comprise any suitable components. In an embodiment shown in FIG. 3B, the filter 36 comprises a first impedance Z0 38A coupled to the servo control voltage Vc 8, and a second impedance Z2 38B coupling the first impedance Z0 38A to ground, wherein the filtered voltage 34B is generated between the first and second impedance Z0 and Z2. Also in the embodiment of FIG. 3B, the control circuitry comprises a third impedance Z1 40 for coupling the output of the microactuator $6_1$ to ground.

FIG. 3D shows an equation illustrating how the control circuitry of FIG. 3B generates the touchdown signal 24 as the difference 26 between the first voltage 34A and the second voltage 34B. The first, second and third impedance Z0, Z2 and Z1 are selected such that the term $(Z1 \cdot Z0 - Z2 \cdot Za1)$ in the equation of FIG. 3D is approximately zero thereby substantially canceling the effect of the servo control voltage Vc on the touchdown signal. Similar to the embodiment described above with reference to FIG. 2D, canceling the servo control voltage Vc from the touchdown signal enables the servo control voltage Vc to servo the microactuator during the touchdown calibration while simultaneously detecting touchdown from the induced voltage Va1 of the microactuator $6_1$. Also as described above, in FIG. 3C the touchdown signal 24A may be filtered 32 to substantially cancel any remaining effect of the servo control voltage Vc on the touchdown signal 24A.

In the embodiments of FIGS. 2B and 3B, two traces couple each microactuator to a printed circuit board (PCB). A first trace couples the input to the PCB, and a second trace couples to the output to the PCB. In an alternative embodiment shown in FIG. 4A, the output of each microactuator is coupled to ground (e.g., coupled to any suitable part of the actuator arm) such that a single trace connects the input of each microactuator to the PCB. In the embodiment of FIG. 4A, the control circuitry generates the touchdown signal 24 in response to a difference 26 between a voltage 42A input into a microactuator $6_1$ and a filtered servo control voltage 42B. In an embodiment shown in FIG. 4B, the filter 44 comprises a first impedance Z2 46A coupled to the servo control voltage Vc 8, and a second impedance Z0 46B coupling the first impedance Z2 46A to ground, wherein the filtered voltage 42B is generated between the first and second impedance Z2 and Z0. Also in the embodiment of FIG. 4B, the control circuitry comprises a third impedance Z1 48 for coupling the servo control voltage Vc 8 to the input of the microactuator $6_1$.

FIG. 4D shows an equation illustrating how the control circuitry of FIG. 4B generates the touchdown signal 24 as the difference 26 between the first voltage 42A and the second voltage 42B. The first, second and third impedance Z2, Z0 and Z1 are selected such that the term $(Za1 \cdot Z2 - Z0 \cdot Z1)$ in the equation of FIG. 4D is approximately zero thereby substantially canceling the effect of the servo control voltage Vc on the touchdown signal. Similar to the embodiment described above with reference to FIG. 2D, canceling the servo control voltage Vc from the touchdown signal enables the servo control voltage Vc to servo the microactuator during the touchdown calibration while simultaneously detecting touchdown from the induced voltage Va1 of the microactuator $6_1$. Also as described above, in FIG. 4C the touchdown signal 24A may be filtered 32 to substantially cancel any remaining effect of the servo control voltage Vc on the touchdown signal 24A.

In the above described embodiments, the impedances (Z0, Z1 and Z2) external to the microactuators may be implemented in any suitable manner. In one embodiment, the impedances comprise suitable passive components (e.g., resistor, capacitor, inductor, etc.) mounted on the PCB and coupled to the microactuator using suitable traces. In another embodiment, one or more of the impedances may be implemented as transmission line impedances by varying a geometry of the traces (e.g., width, thickness, etc.).

In one embodiment, in addition to selecting the external impedances (Z0, Z1 and Z2) so that the numerator of the above described equations is approximately zero, the impedances may be selected so that their frequency response attenuates the effect of the servo control voltage Vc on the touchdown signal. For example, the external impedances (Z0, Z1 and Z2) may be selected to implement a suitable high pass filter to attenuate the lower servo control frequencies of the servo control voltage Vc.

Any suitable microactuator may be employed in the embodiments of the present invention, such as one or more piezoelectric actuators having a shape that deforms in response to an applied electrical signal (e.g., an applied voltage). In the embodiment of FIG. 1A, the microactuator couples a suspension to the actuator arm in order to rotate the suspension about a pivot to servo the head over fine movements. However, the microactuator may be located at any suitable location on the actuator arm, such as a microactuator which couples a gimbal to the suspension, wherein the head is mounted to the gimbal.

Any suitable control circuitry may be employed to implement the embodiments of the present invention, such as any suitable integrated circuit or circuits. In one embodiment, the control circuitry comprises a microprocessor executing instructions, the instructions being operable to cause the microprocessor to perform the touchdown calibration procedure described above. The instructions may be stored in any suitable computer-readable medium, such as on the disk of the disk drive or in a semiconductor memory (e.g., a Flash). In yet another embodiment, the control circuitry may comprise suitable logic circuitry, such as state machine circuitry.

What is claimed is:

1. A disk drive comprising:
a disk comprising first surface and a second surface;
a first head actuated over the first surface by a first microactuator;
a second head actuated over the second surface by a second microactuator;
a fly height actuator operable to adjust a fly height of the first head; and
control circuitry operable to:
apply a servo control voltage to the first and second microactuators;
adjust the fly height actuator to decrease a fly height of the first head; and
generate a touchdown signal in response to a difference between a first voltage output by the first microactuator and a second voltage output by the second microactuator, wherein the touchdown signal indicates when the first head contacts the first disk surface.

2. The disk drive as recited in claim 1, wherein the control circuitry is further operable to filter the touchdown signal to substantially cancel an effect of the servo control voltage on the touchdown signal.

3. The disk drive as recited in claim 1, wherein the control circuitry comprises:
a first impedance coupling the output of the first microactuator to ground; and
a second impedance coupling the output of the second microactuator to ground.

4. The disk drive as recited in claim 3, wherein the control circuitry generates the touchdown signal according to:

$$\frac{Z1 \cdot Za2 - Z2 \cdot Za1}{(Za2 + Z2)(Za1 + Z1)} \cdot Vc + \frac{Z1}{Za1 + Z1} \cdot Va1$$

where:
Z1 is the first impedance;
Z2 is the second impedance;
Va1 is the first voltage output by the first microactuator;
Za1 is an impedance of the first microactuator;
Za2 is an impedance of the second microactuator; and
Vc is the servo control voltage.

5. The disk drive as recited in claim 4, wherein Z1 and Z2 comprise values such that the term (Z1·Za2−Z2·Za1) is approximately zero.

6. The disk drive as recited in claim 4, wherein Z1 and Z2 comprise values such that the term:

$$\frac{Z1 \cdot Za2 - Z2 \cdot Za1}{(Za2 + Z2)(Za1 + Z1)}$$

attenuates low frequencies.

7. A disk drive comprising:
a disk surface;
a head actuated over the disk surface by a microactuator;
a fly height actuator operable to adjust a fly height of the head; and
control circuitry operable to:
apply a servo control voltage to the microactuator;
adjust the fly height actuator to decrease a fly height of the head;
filter the servo control voltage to generate a filtered voltage; and
generate a touchdown signal in response to the microactuator and the filtered voltage, wherein the touchdown signal indicates when the head contacts the disk surface.

8. The disk drive as recited in claim 7, wherein the control circuitry is further operable to generate the touchdown signal in response to a difference between a voltage output by the microactuator and the filtered voltage.

9. The disk drive as recited in claim 7, wherein the control circuitry is further operable to generate the touchdown signal in response to a difference between a voltage input into the microactuator and the filtered voltage.

10. The disk drive as recited in claim 7, wherein the control circuitry is further operable to filter the touchdown signal to substantially cancel an effect of the servo control voltage on the touchdown signal.

11. The disk drive as recited in claim 8, wherein:
the control circuitry comprises a filter for filtering the servo control voltage;
the filter comprises a first impedance coupled to the servo control voltage;
the filter comprises a second impedance coupling the first impedance to ground; and
the filtered voltage is generated between the first and second impedance.

12. The disk drive as recited in claim 11, wherein the control circuitry comprises a third impedance for coupling the output of the microactuator to ground.

13. The disk drive as recited in claim 12, wherein the control circuitry generates the touchdown signal according to:

$$\frac{Z1 \cdot Za2 - Z2 \cdot Za1}{(Za2 + Z2)(Za1 + Z1)} \cdot Vc + \frac{Z1}{Za1 + Z1} \cdot Va1$$

where:
Z0 is the first impedance;
Z2 is the second impedance;
Z1 is the third impedance;
Va1 is the voltage output by the microactuator;
Za1 is an impedance of the microactuator; and
Vc is the servo control voltage.

14. The disk drive as recited in claim 13, wherein Z0, Z1 and Z2 comprise values such that the term (Z1·Z0−Z2·Za1) is approximately zero.

15. The disk drive as recited in claim 13, wherein Z1 and Z2 comprise values such that the term:

$$\frac{Z1 \cdot Za2 - Z2 \cdot Za1}{(Za2 + Z2)(Za1 + Z1)}$$

attenuates low frequencies.

16. The disk drive as recited in claim 9, wherein:
the control circuitry comprises a filter for filtering the servo control voltage;
the filter comprises a first impedance coupled to the servo control voltage;
the filter comprises a second impedance coupling the first impedance to ground; and
the filtered voltage is generated between the first and second impedance.

17. The disk drive as recited in claim 16, wherein the control circuitry comprises a third impedance for coupling the servo control voltage to the input of the microactuator.

18. The disk drive as recited in claim 17, wherein the control circuitry generates the touchdown signal according to:

$$\frac{Z1 \cdot Za2 - Z2 \cdot Za1}{(Za2 + Z2)(Za1 + Z1)} \cdot Vc + \frac{Z1}{Za1 + Z1} \cdot Va1$$

where:
Z2 is the first impedance;
Z0 is the second impedance;
Z1 is the third impedance;
Va1 is the voltage output by the microactuator;
Za1 is an impedance of the microactuator; and
Vc is the servo control voltage.

19. The disk drive as recited in claim 18, wherein Z0, Z1 and Z2 comprise values such that the term (Za1·Z2−Z0·Z1) is approximately zero.

20. The disk drive as recited in claim 18, wherein Z1 and Z2 comprise values such that the term:

$$\frac{Z1 \cdot Za2 - Z2 \cdot Za1}{(Za2 + Z2)(Za1 + Z1)}$$

attenuates low frequencies.

21. A method of operating a disk drive comprising a disk comprising first surface and a second surface, a first head actuated over the first surface by a first microactuator, a second head actuated over the second surface by a second microactuator, and a fly height actuator operable to adjust a fly height of the first head, the method comprising:
applying a servo control voltage to the first and second microactuators;
adjusting the fly height actuator to decrease a fly height of the first head; and
generating a touchdown signal in response to a difference between a first voltage output by the first microactuator and a second voltage output by the second microactuator, wherein the touchdown signal indicates when the first head contacts the first disk surface.

22. A method of operating disk drive comprising a disk surface, a head actuated over the disk surface by a microactuator, and a fly height actuator operable to adjust a fly height of the head, the method comprising:
applying a servo control voltage to the microactuator;
adjusting the fly height actuator to decrease a fly height of the head;
filtering the servo control voltage to generate a filtered voltage; and
generating a touchdown signal in response to the microactuator and the filtered voltage, wherein the touchdown signal indicates when the head contacts the disk surface.

* * * * *